May 17, 1927.  
G. L. MATTHIAS ET AL  
1,629,170  
APPARATUS FOR FORMING SLEEVES AND ASSOCIATING THEM WITH ARTICLES  
Filed Feb. 16, 1924  3 Sheets-Sheet 1

Inventors  
Gilbert L. Matthias  
Waldemar D. Knenitt  
By Robert M. Pierson  
Atty

May 17, 1927. 1,629,170
G. L. MATTHIAS ET AL
APPARATUS FOR FORMING SLEEVES AND ASSOCIATING THEM WITH ARTICLES
Filed Feb. 16, 1924 3 Sheets-Sheet 2

Inventors
Gilbert L. Matthias
Waldemar D. Knentt
By Robert M. Pierson
Atty.

Patented May 17, 1927.

1,629,170

UNITED STATES PATENT OFFICE.

GILBERT L. MATTHIAS AND WALDEMAR D. KMENTT, OF AKRON, OHIO, ASSIGNORS TO THE B. F. GOODRICH COMPANY, OF NEW YORK, N. Y., A CORPORATION OF NEW YORK.

APPARATUS FOR FORMING SLEEVES AND ASSOCIATING THEM WITH ARTICLES.

Application filed February 16, 1924. Serial No. 693,280.

This invention relates to the art of assembling articles such as tire-valve caps, for example, with associated members such as the rubber sleeves which are commonly applied to the stems of such caps to prevent the cap from cutting a folded inner tube to which it is attached.

Heretofore the rubber sleeves commonly have been applied to the stems of the respective valve-caps by hand operations, whereby the most skillful workers can effect but a few assemblies per minute.

The chief objects of this invention are to provide improved time-saving and labor-saving procedure and apparatus for work of this character. A more specific object is the provision of a largely automatic machine for assembling rubber sleeves with valve-caps. A further object is to provide an apparatus whereby a length of rubber tubing may be severed into short lengths to form the sleeves and the latter rapidly assembled with the valve-caps as they are thus formed.

In general, the machine in the preferred form here shown, comprises a feed hopper arranged to deliver caps to a guideway leading therefrom to an assembling position; mechanism adapted to advance the caps in succession, at the assembling position, to force their respective stems into an end of a long length of tubing supported in receiving position; means for severing the tubing as each cap is thus advanced, the severed length of the tubing constituting a sleeve on the stem of the valve-cap, tube-clamping members adapted to retain the end of the tubing in proper position during the assembling operation and to release the tubing after each such operation; means including a pair of feed rolls for advancing the long length of tubing to its receiving position between the advancing of successive caps, while the tube-clamping members are released; and means comprising a reciprocating slide adapted to engage the finished work to eject it from the machine.

Figures 1, 3, 4:
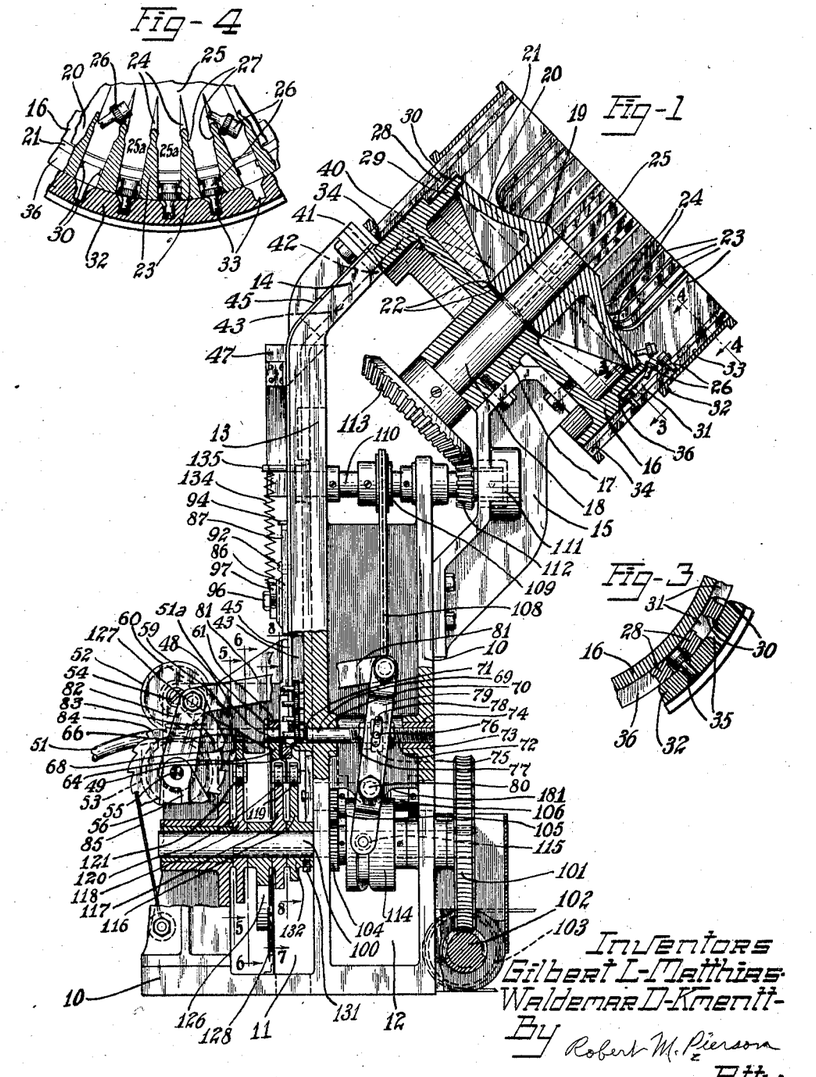
Fig. 1 is a front elevation, partly broken away and partly in section, of a machine embodying and adapted to carry out my invention in its preferred form.
Fig. 3 is a section on line 3—3 of Fig. 1.
Fig. 4 is a section on line 4—4 of Fig. 1.

Referring to the drawing, 10 designates generally a frame casting formed near its base with openings 11 and 12 therein (Fig. 1) to receive various work-controlling instrumentalities, and said frame 10 is formed above with an upstanding bracket portion 13 terminating in an inclined portion 14, as best shown in Fig. 1. Said inclined portion and a bracket 15, secured to the opposite side of the frame 10, support the feed hopper structure in an inclined position, preferably about 45° from the horizontal.

Said feed hopper structure comprises a lower, stationary, generally cylindrical member 16 formed with a central bearing 17 in which is journaled a shaft 18, upon the upper end of which is mounted a rotary hopper unit comprising a hopper-bottom member 19 secured to the shaft and formed with an upper surface 20 sloping outwardly from its center to its periphery, the periphery thereof lying in the same plane with the upper annular surface 21 of the stationary member 16. The surface 21 closely encircles and in effect constitutes a continuation of the sloping surface 20 of the rotary hopper-bottom member. Wear washers 22 are preferably interposed between the members 19 and 16 for maintaining the periphery of the surface 20 and the surface 21 flush with each other.

The rotary hopper unit includes also cap-agitating and cap-guiding, radial, upstanding, circumferentially spaced webs 23, 23, formed on the periphery of the hopper-bottom member 19, the inner edges 24 of the webs 23, at the base of the latter, curving toward the center of the member 19 to provide, as clearly shown in Fig. 1, a bowl-shaped cap-receiving space 25, from which, as more clearly shown in Fig. 4, there radiates a series of cap-guiding passages 25ª, 25ª, provided by the spacing of the webs 23. The webs 23 are so tapered toward the axis of the hopper, as shown, that the passages 25ª are substantially of a uniform width just sufficient to permit the passage of the caps, designated 26, 26, when the latter are disposed radially of the hopper. The webs 23 may be notched on their side faces adjacent their inner edges 24, as shown at 27, 27, Fig. 4, to facilitate the guiding into the passages 25ª of caps obliquely disposed with relation to the passages. The webs 23 extend radially outward past the stationary, annular surface 21, and portions 28, 28, thereof extend downward in telescoping relation to a reduced upper portion 29 of the lower, stationary member 16 of the hopper structure, the extensions 28 being formed with ribs 30, 30, on the opposite sides thereof and adjacent their inner edges, the extensions 28, including the ribs 30, defining passages 31, 31, leading downwardly from the passages 25ª and adapted, as best shown in Figures 3 and 4, to permit the passage of caps downward about the reduced portion 29 of the stationary member 16, but only such caps as are disposed radially of the hopper, as is clearly shown in Figures 3 and 4.

Secured to the outer edges of the webs 23 and web-extensions 28 is a hollow, cylindrical casting 32, the lower portion of which extends below the extensions 28 and telescopes upon the lower portion of the stationary, cylindrical member 16, as clearly shown in Fig. 1. The cylindrical member 32 is formed with circumferentially spaced, parallel, longitudinal channels which have the form of grooves 33, 33, 34, 34, on the inner face of the member in its upper portion and in its lower marginal portion respectively, where its wall is relatively thick, and constitutes slots 35, 35, throughout its intermediate portion, where its wall is thin, said channels being adapted to permit the passage of the narrow stems of the valve-caps and their slot portions, being open to the exterior of the structure, are adapted to permit the loosening of a cap by hand in case it becomes jammed, and to permit a view of the stacks of caps in said channels.

Figures 2, 5, 6:
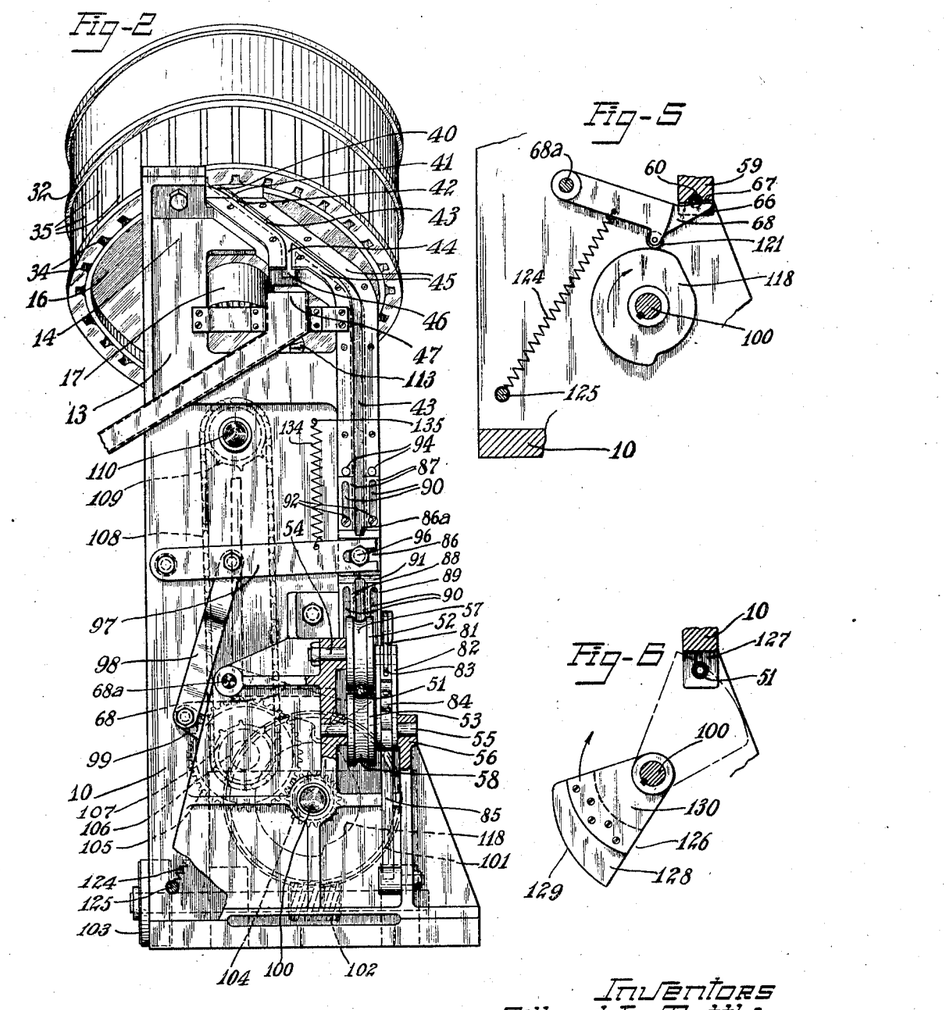
Fig. 2 is an elevation, partly broken away and in section of the machine as viewed from the left of Fig. 1.
Fig. 5 is a section on line 5—5 of Fig. 1.
Fig. 6 is a section on line 6—6 of Fig. 1.
Figures 7, 8, 9, 10, 11:
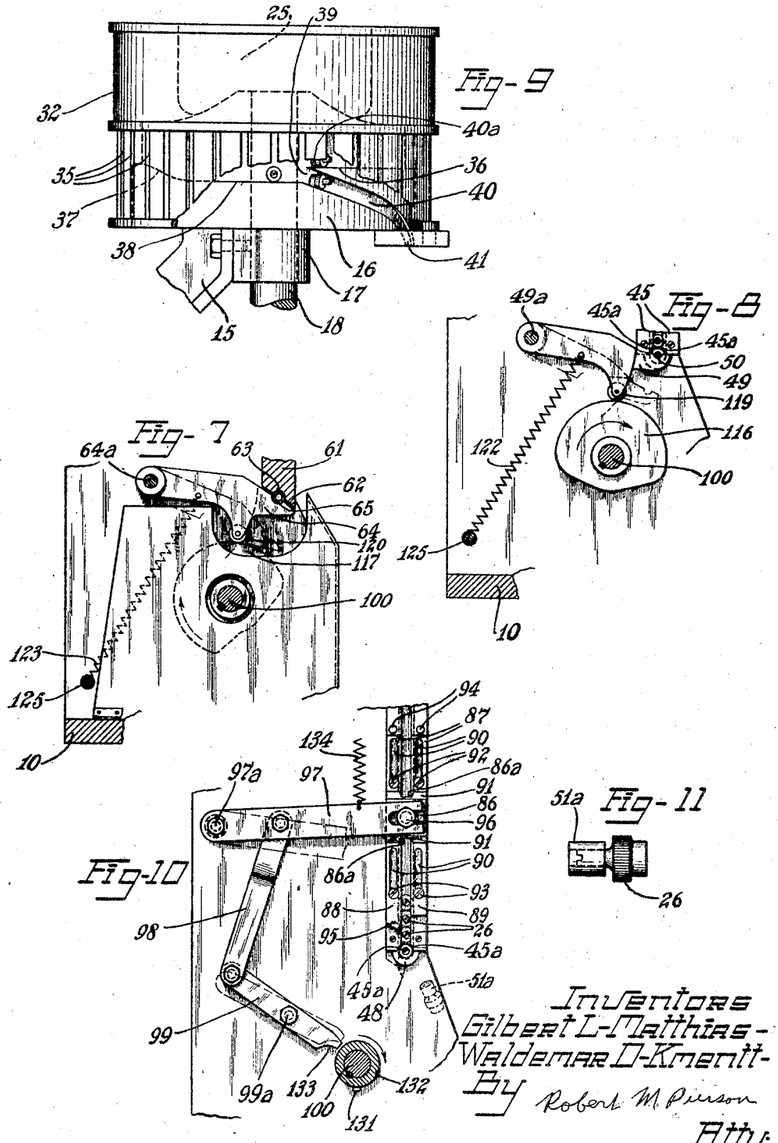
Fig. 7 is a section on line 7—7 of Fig. 1.
Fig. 8 is a section on line 8—8 of Fig. 1.
Fig. 9 is an elevation, partly broken away, of a cap-feeding hopper.
Fig. 10 is a detailed elevation of mechanism for ejecting the finished work.
Fig. 11 is an elevation of a valve-cap and a sleeve thereon constituting the finished work.

The reduced portion 29 of the member 16 is defined at its lower end by a circumferential shoulder or ledge 36 formed on the member 16 and constituting a lower end-closure or floor for the passages 31, except in a small arc at an intermediate part of its length, (see Fig. 9) where, as shown at 37, it slopes downwardly, receding from the ends of the passages 31, to a lower, straight portion 38 spaced just far enough below the ends of the extensions 28 to permit the passage of the caps as the latter slide along upon the ledge. The lower straight portion 38 of the shoulder or ledge 36 extends to the entrance 39 of, and continues as the floor of, a cap-guiding groove 40 formed in the outer face of the member 16, said groove 40 and the ledge 36 defining a pick-off point or projection 40ª (Fig. 9) adapted to separate the lowermost cap from each of stacks of caps in the passages 31, said lowermost cap proceeding in the groove 40 while the rest of the stack passes onto the more elevated portion of the ledge 36. The groove 40 constitutes a hopper-outlet channel terminating at 41, at the high side of the lower end margin of the inclined stationary member 16, where it communicates with the entrance 42 of a cap-feeding guideway or groove 43 formed in the bracket portion 13 of the frame and extending obliquely and then vertically downward to the opening 11 in the frame 10, as best shown in Figs. 1 and 2. A branch groove 44, (Fig. 2) formed in the bracket member 13, leads downwardly from the upper, oblique portion of the groove 43, and is adapted to direct excess caps from the guideway groove 43 when the latter have filled to the entrance of said branch groove, the sloped upper portion of the groove (see Fig. 2) being adapted to cause the valve caps to pass over said entrance, by momentum, except when the groove 43 is so filled. Metallic strips 45, 45, are secured to the frame 10 on the respective sides of the grooves 43 and 44, extending partially over the latter to retain the caps therein by engagement with the tops of the body portions of the caps, the stems of the caps projecting through the space between the strips. As shown in Figs. 8 and 10, said strips at their lower ends are cut away at 45ª, 45ª, so that a cap may be advanced horizontally from the lower end of the guideway 43. Below the outlet 46 from the excess-cap-removing guideway 44, a chute 47 is supported on the frame 10 to conduct excess caps from the machine.

For supporting a column of caps in the guideway 43 so that the lowermost cap is in position for effecting an assembly, a cap-supporting projection 48 is formed on the frame 10 at the lower end of said guideway. As shown in Figs. 1 and 8, a vertically oscillating member 49, is pivoted on the frame 10 at 49ª (Fig. 8), for operation in the opening 11 of the frame 10, and said member is formed with a grooved supporting face 50 (Fig. 8) for engaging the outer end portion only of the stem of the lowermost cap as the latter rests upon the support 48, so that the longitudinal axis of the cap will be substantially horizontal, the member 49 being adapted to be periodically withdrawn from such engagement by swinging downwardly when the caps in succession are horizontally advanced, but only after the stem of the cap has started into the end of the tubing.

For feeding the tubing, designated 51, to the assembling position, a pair of feed rolls 52 and 53 are supported on the frame 10, as clearly shown in Fig. 1, at the other side of the opening 11 from the terminus of the cap-feeding guideway 43. The upper roll 52, being an idler roll, is journaled on a stud 54 secured in the frame 10 as best shown in Fig. 2, and the lower roll 53, is secured to a shaft 55 journaled in bearings 56, 56 formed in the frame 10. The rolls 52 and 53, are formed with mating circumferential grooves 57 and 58 for receiving the tubing 51, the groove 58 of the roll 53 preferably being roughened to prevent slippage of the tubing.

Extending downwardly from the frame 10 into the opening 11 is a projection 59 formed with a tube-guiding aperture 60, as shown in Fig. 1, said aperture leading from adjacent the mating rolls 52 and 53 horizontally toward and to a position adjacent the bottom of the guideway 43. Between the projection 59 and the guideway 43 a tube-clamping projection 61 is formed on the frame 10, extending into the opening 11, said projection 61 having a lower oblique face 62, as shown in Fig. 7, the face 62 having a groove 63 therein forming in effect a continuation of a portion of the upper surface of the aperture 60. A lower, vertically oscillating, tube-supporting member 64, referring to Figs. 1 and 7, is pivoted on the frame 10 at 64ª, its face end extending into the opening 11, and said member 64 is formed with an oblique face provided with a groove 65 adapted so to mate with the groove 63 in the member 61 as to clamp the end of the tubing 51, as clearly illustrated in Fig. 1, in alignment with the lowermost cap in the guideway 43, the oblique faces of the members 61 and 64 being such as to permit the ejection of an assembly forwardly and downwardly from between said members when the latter are separated.

A notch 66 is formed in the lower face of the projection 59, said notch extending into the aperture 60, the face 67 defining its upper end as shown in Figure 5. Arranged for cooperation with the notch 66 is a vertically oscillating tube-clamping member 68 pivoted at 68ª on the frame 10, for operation in the opening 11 of the latter, the upper clamping surface of the member 68 conforming with the face 67, but being ungrooved, so that in clamping the tubing 51 against the upper surface of the aperture 60 it is adapted to indent the tubing, as shown clearly in Fig. 5, the more firmly to hold the tubing against longitudinal movement.

Mechanism is provided for advancing the successive caps so that the stem of the cap enters the end of the tubing while the latter is held by the clamping means above described. Said mechanism, referring especially to Fig. 1, comprises a cap-advancing plunger 69 mounted in a bore 70 formed in the frame 10 immediately above the cap-supporting projection 48, the plunger 69 having a reduced end 71 adapted to enter the body portion of the lowermost cap in the guideway 43. The rear end portion of the plunger is threaded, as shown at 72, a threaded bushing 73 being screwed thereon and slidably mounted in a bearing 74 formed in the frame 10 at the rear side of the opening 12. For actuating the plunger a sleeve 75 formed with a stud 76 is secured on said plunger by nuts 77, 77, the stud 76 occupying a slot 78 in a lever 79 pivoted at 80 to a web 181 extending across the opening 12 in the frame 10, the lever 79 extending below its pivot 80 and being there provided with actuating means hereinafter described.

For operating the tube feeding rolls 52 and 53 to advance the tubing in successive movements in synchronism with the action of the plunger 69, a link 81 connects the upper end of the lever 79 with a pawl-operating arm 82, which arm 82 is loosely pivoted on the shaft 55 of feed roll 53, and a pawl 83 is loosely pivoted on the arm 82 to hang by gravity in engagement with a ratchet wheel 84 secured on the shaft 55, whereby the shaft 55 is adapted to be intermittently rotated clock-wise, a leaf spring 85 being so secured to the frame 10 as to engage the notches in the ratchet 84 to prevent counter-clockwise rotation of the shaft 55.

For severing the successive lengths or sleeves from the tubing between its advancing movements, such lengths being shown at 51ª in Figs. 1 and 10, a rotary knife structure 126 adapted to coact in a shearing action with the frame projection 61, is secured upon a main drive shaft 100 journaled in the lower part of the frame 10.

The work-ejecting means includes a vertically reciprocating slide 86 which, referring especially to Figs. 2 and 10, is mounted on the frame 10 adjacent the guideway 43, to slide on the metallic strips 45. Said slide 86 includes a middle, crosshead portion from which upwardly extends a pair of arms 87, 87 and from which downwardly extends a pair of arms 88 and 89, the arms of each pair being spaced slightly farther apart than the width of a valve cap stem and each arm being formed with slots 90, 90, occupied by retaining and guiding screws 92, 92 or 93, 93 threaded into the strips 45. The center portion of the slide 86, as more clearly shown in Fig. 1, is bowed out from the guideway 43 a sufficient distance to clear the stems of caps projecting through the space between the strips 45, the upper and lower oblique portions 91, 91, of the slide 86 being notched as at 86ª, to clear the stems of the caps.

For limiting the upward movement of the slide 86, a pair of studs 94, 94 project from the strips 45. The lower end of the arm 88 is formed, as shown in Fig. 10, with a work-engaging, cam surface 95 adapted to effect a transverse ejecting of the finished work from between the tube-supporting members 61 and 64 while the latter are separated, the cap-supporting member 49 at such times being withdrawn downwardly. For actuating the slide 86 a central stud 96 projects from the outer face thereof and is straddled by the slotted end of a lever 97 pivoted at 97ª to the frame 10, and a link 98 connects said lever with a second lever 99, pivoted to the frame at 99ª.

The driving means for the various work-manipulating instrumentalities includes a worm gear 101 secured upon the main drive shaft above mentioned and meshed with a worm 102 provided with a belt pulley 103, having driving connection with a suitable source of power, not shown.

For driving the rotary unit of the cap-feeding hopper, a gear 104 is secured on the shaft 100 and meshed with a gear 105 secured on a shaft 106 journaled in the frame 10, said shaft having a sprocket 107 secured thereto and connected by a sprocket chain 108 with a sprocket 109 secured on a shaft 110 journaled in the top of the frame 10 and in an end-thrust bearing 111 on the bracket 15. A bevel gear 112 is secured on the sprocket shaft 110 and meshes with a bevel gear 113 secured on the shaft 18 of the rotary hopper unit.

For operating the cap-advancing plunger 69 and the tube-feeding roll 53, a groove cam 114 is secured to the shaft 100 as shown in Fig. 1, the groove of the cam 114 being occupied by a roller 115 journaled onto the lower end of the lever 79.

For operating the cap-supporting member 49, the tube-supporting member 64 and the tube-clamping member 68, respective involute cams 116, 117, and 118 are secured on the drive shaft 100, rollers 119, 120 and 121 being respectively journaled on the members 49, 64 and 68 and being held in engagement with the surfaces of respective cams 116, 117 and 118 by pull springs 122, 123 and 124 having their ends secured to a rod 125 extending across the opening 11 in the frame 10 and to said members respectively.

The rotary knife structure 126 above mentioned, for cutting the rubber sleeves or lengths from the tubing, is secured, as shown in Fig. 1, on the shaft 100, in the opening 11 in the frame 10 and between the cam 117 and the cam 118, a groove 127 being formed in the frame 10 extending upwardly from the opening 11 therein between the members 59 and 61 for clearing the blade 128 of the rotary knife structure 126, the blade 128 being formed to cooperate with the frame projection 61 to shear the successive lengths 51ª from the tubing 51. The cutting edge 129 of the blade 128 is so volutely curved as to shear the tubing with a saw effect. The blade 128 is removably secured, as shown, to a supporting sector 130 forming part of the rotary knife structure 126, so that the blade 128 may be readily withdrawn from the machine to be resharpened or to be replaced by a new blade.

For operating the ejecting slide 86, a stud 131 is secured on the hub 132 of the cam 116, and adapted at each rotation of the shaft 100, to engage the adjacent end of the lever 99, the latter being formed with a stud-engaging face 133, to operate the slide 86 downwardly, a retractile spring 134 being secured to the lever 97 and to a pin 135 on the frame 10, as clearly shown in Fig. 2, normally to retain the slide 86 in a raised position.

In operation, valve caps 26 are supplied to the bowl-shaped space 25 of the cap-feeding hopper, and a length of the tubing 51 is started between the feed rolls 52 and 53. The drive shaft 100 is continuously driven and rotates the hopper unit comprising the hopper-bottom member 19, webs 23, and slotted cylinder 32.

Such rotation of the tilted hopper unit causes a tumbling of the valve caps therein, with the result that some of the caps, in the lower part of the orbit, pass outward and downward between the webs 23 in such position as to be fully received by the passages 31, in which they descend until the cap, or the lowermost of a stack of caps, rests upon the ledge 36. In case of jamming of caps at the upper end of a passage 31, as shown in Fig. 1, the jam is relieved by tumbling of the caps when that part of the tilted hopper unit rises to the upper part of its orbit.

The unit thus rotating, with caps or stacks of caps in some or all of the passages 31, their stems projecting through the slots 34, the lowermost cap in each of said passages, is slid along upon the ledge 36 and passes into the groove 40, as will be best understood with reference to Fig. 9, the walls of the slots 34 impelling the caps by engagement with the latter's stems, when the caps in following the oblique portion of said ledge, have ceased to be engaged by the web-extensions 28, and the other caps of each stack, separated from the lowermost cap by the pick-off point 40ª, pass onto the more elevated part of the ledge 36.

The caps pass by gravity from the groove 40 into the guideway 43, being carried over the mouth of the groove 44 by their momentum, and stack themselves upon the cap-supporting frame-projection 48, and the oscillatory cap-supporting member 49. The guideway 43 usually fills up to the branch guideway 44, where excess caps, being stopped by those in advance, fall into the chute 47 and pass from the machine.

The plunger 69, being reciprocated by its driving mechanism above described, engages the lowermost cap in the guideway 43 and, while the cap-supporting member 49 moves downward out of the way, advances the cap and thereby inserts the stem of the cap into the end of the tubing 51, the latter being clamped in position by the clamping means above described.

As the cap is thus advanced, the revolving knife 128 cuts the tubing 51 to the proper length, leaving a sleeve 51ª upon the stem of the cap. The tube-supporting member 64 then withdraws downwardly, and while the tubing 51 is still clamped by the member 68, the stud 131 engages the lever 99 and suddenly actuates downwardly the ejector slide 86, the work-ejecting arm 88 of which ejects the assembled cap and sleeve downwardly and laterally from the machine, as shown in Fig. 10.

While the plunger 69 is being retracted, and after the ejection of the cap assembly, the roll 53 is given a short rotary movement by its driving means above described, advancing the end of the tubing 51 to assembling position. As the retraction of the plunger 69 is completed, the cap-stem supporting member 49 rises to engage the stem of the next valve cap in the guideway 43, just as said cap drops into position, upon the withdrawal of the plunger. The tube-supporting or clamping members 64 and 68 then swing into position respectively to support and clamp the tubing 51 for the next assembling operation.

The tubing 51 is preferably supplied from a reel, not shown, and after one reel is nearly emptied, an end of another reel of tubing may be cemented to the trailing end of that which precedes it, without interrupting the operation of the machine.

Modifications may be resorted to without departing from the scope of the invention as claimed.

We claim:

1. Apparatus for forming sleeves and applying them to articles, said apparatus comprising means for feeding a length of tubing to a severing and assembling position, means for there severing successive sleeve lengths therefrom, and means for inserting said articles into said sleeve lengths successively while the later are substantially in the position in which they are severed from said long length of tubing.

2. Apparatus for forming sleeves and applying them to articles, said apparatus comprising means for feeding a length of tubing to a determinate severing position, means for there severing successive sleeve lengths therefrom, means for conducting a succession of said articles to a determinate assembling position, and means for effecting such relative movement as to apply the successive sleeve lengths to the successive articles.

3. Apparatus for forming sleeves and applying them to articles, said apparatus comprising means for supporting a file of said articles with the leading article in a determinate position, means for feeding a length of tubing to a severing and assembling position adjacent and in alignment with said leading article, means for there severing successive sleeve lengths from said tubing, and means for so advancing successive articles from the leading end of said file as to insert them in said sleeve lengths successively as the latter are severed.

4. Apparatus for forming sleeves and applying them to valve-cap stems, said apparatus comprising a guideway adapted to conduct a column of said caps to an assembling position, said guideway being adapted to permit the removal of the lowermost cap transversely from said column, a support for said column of caps at the bottom of said guideway, means for feeding a length of tubing to a severing position adjacent the lowermost cap, means for there severing successive lengths from the end of said tubing, and means for moving successive caps transversely from the bottom of said column and inserting their stems in the successive sleeve lengths while the latter are substantially in the position in which they are severed from said length of tubing.

5. Apparatus for applying sleeves to valve-cap stems, said apparatus comprising means for presenting successive sleeves in an assembling position, means for conducting a succession of caps into a position in alignment with and adjacent the end of a sleeve so presented, means for slidably supporting the cap in such position by engagement with its body portion and the outer end portion of its stem, and means for sliding the cap toward said sleeve, the spacing of said sleeve-presenting means and said cap-supporting means and the form of the latter being such as to permit the cap's stem to enter the sleeve while the cap is still supported by said supporting means.

6. Apparatus for applying sleeves to articles, said apparatus comprising means for presenting successive sleeves in an assembling position, means for supporting a column of articles so that the lowermost article thereof is in alignment with and adjacent the end of a sleeve so presented, and reciprocable means for advancing successive articles transversely from the bottom of said column into association with the successive sleeves, said reciprocable means being adapted to support the remainder of the articles in said column while advancing the lowermost article, and to permit the remainder of the articles to fall after said reciprocable means is retracted.

7. Apparatus for forming sleeves and applying them to articles, said apparatus comprising means for feeding a length of tubing so that an end thereof is presented in an assembling position, means for feeding a succession of articles into a position in alignment with and adjacent the tube end thus presented, reciprocable means for advancing said article into the end of said tubing, means for cutting the tubing beyond the inserted end of said article, and means connected to said reciprocable means for operating said tube-feeding means to advance the cut end of said tubing into the assembling position as said reciprocable means is retracted.

8. Apparatus for forming sleeves and applying them to articles, said apparatus comprising means for feeding a length of tubing so that an end thereof is presented in an assembling position, said tube-feeding means including a pair of feed rolls and a pawl, pawl-operating arm and ratchet for intermittently driving one of said rolls, means for feeding a succession of articles into a position in alignment with and adjacent the tube end so presented, reciprocable means for advancing said article into the end of said tubing, means for cutting the tubing beyond the inserted end of said article, and a link connected to said reciprocable means and to said pawl operating arm.

9. Apparatus for forming sleeves and applying them to articles, said apparatus comprising means for intermittently presenting an end of a length of tubing to an assembling and severing position, means for inserting an article into the end of said tubing so presented, means for severing said tubing beyond the inserted end of said article, and means for periodically clamping said tubing in the severing and assembling position, while the latter is being severed.

10. Apparatus for forming sleeves and applying them to articles, said apparatus comprising means for intermittently presenting an end of a length of tubing to an assembling and severing position, means for inserting an article into the end of said tubing so presented, a rotary knife for severing said tubing beyond the inserted end of said article, and means for periodically clamping said tubing in the severing and assembling position, while the latter is being severed, said means including an oscillatable member and a cam secured for rotation with said knife for oscillating said member.

11. Apparatus for forming sleeves and applying them to articles, said apparatus comprising means for intermittently feeding an end of a length of tubing to an assembling and severing position, means for inserting an article into the end of said tubing, means for severing said tubing beyond the inserted end of said article, and means for periodically pinching said tubing to hold it in position during the assembling and severing operations.

12. Apparatus for forming sleeves and applying them to articles, said apparatus comprising means for intermittently feeding an end of a length of tubing to an assembling and severing position, said means including an apertured member for conducting the tubing to said position and having a notch extending transversely into the aperture thereof, means for inserting an article into the end of said tubing, means for severing said tubing beyond the inserted end of said article, and means for periodically pinching said tubing to hold it in position during the assembling and severing operations, said pinching means comprising an oscillatable member adapted for traversing said notch to pinch the tubing against said apertured member.

13. Apparatus for inserting reduced end portions of articles in respective sleeve members, said apparatus comprising means for slidably supporting an article of irregular shape in an assembling position, said means including a stationary support for engaging the larger portion of the article and a movable support for engaging its reduced end portion, means for advancing said article from said supports by engagement with the larger portion, and means for removing said movable support from engagement with said reduced portion as the article is so advanced.

14. Apparatus for applying sleeves to valve-cap stems, said apparatus comprising means for presenting sleeves to an assembling position, means for positioning valve-caps in alignment with an end of a sleeve so presented, said means including a stationary support for engaging the body portion of a cap, said support being spaced a distance less than the length of a cap-stem from the sleeve, and a movable support between said stationary support and the sleeve, said movable support being initially adapted to engage the end of the cap-stem, means for advancing said cap on said supports whereby the cap's stem is inserted into the end of the sleeve, and means for removing said movable support from engagement with the cap-stem after the latter's outer end has entered the sleeve but before the body portion of the cap has been advanced into engagement with said movable support.

15. Apparatus for applying sleeves to valve-cap stems, said apparatus comprising means for presenting sleeves to an assembling position, means for positioning valve-caps in alignment with an end of a sleeve so presented, said means including a stationary support for engaging the body portion of a cap spaced a distance less than the length of a cap-stem from the sleeve and an oscillatable support between said stationary support and the sleeve, said oscillatable support being adapted initially to engage the end of the cap-stem, means for advancing said cap on said supports whereby the cap's stem is inserted into the end of the sleeve, and means for operating said oscillatable support to remove it from engagement with the cap-stem after the latter's outer end has entered the sleeve but before the body portion of the cap has been advanced into engagement with said oscillatable support, said operating means being interconnected with said cap-advancing means for synchronous operation.

16. Apparatus for applying sleeves to articles such as valve-caps, said apparatus comprising two supports each for holding the sleeve and the article, respectively, horizontally aligned in determinate spaced relation, a plunger adapted to advance over the surface of one of said supports to slide the article thereon into association with the sleeve mounted on the other support, and actuating means for said plunger having such adjustable connection therewith as to provide for variation of the stroke of the plunger.

17. Apparatus for forming sleeves and applying them to articles, said apparatus comprising means for feeding a length of tubing so as to present an end thereof at an assembling and severing position, means for feeding a plurality of articles in succession to a position adjacent to and in alignment with the end of the tubing so presented, means for advancing an article so positioned into the end of said tubing, said means comprising a plunger, a member adjustably secured thereto and a lever for engaging said member, means connected to said lever for operating said tube-feeding means, and means for severing said tubing beyond the inserted end of said article.

18. Apparatus for forming sleeves and applying them to articles, said apparatus comprising means for supporting an end of a length of tubing in an article-receiving position, means for inserting an article into the end of said tubing, means for cutting said tubing beyond the inserted end of said article, and means for ejecting the finished assembly from the apparatus.

19. Apparatus for applying sleeves to articles, said apparatus comprising means for supporting a sleeve in an article-receiving position, said means including a pair of relatively movable sleeve-clamping members, means for inserting an article into said sleeve, means for separating said relatively movable sleeve-clamping members, and means for ejecting the assembled articles from between the separated members.

20. Apparatus for applying rubber sleeves to the stems of tire-valve caps, said apparatus comprising clamping members relatively movable vertically and having cooperating, grooved, downwardly slanting faces for supporting a rubber sleeve, means for inserting the stem of a valve-cap in a sleeve clamped thereby, means for separating said clamping members, and means adapted to engage the cap and sleeve assembly to eject the same obliquely downward from between the separated clamping members so as to clear the latter.

21. Apparatus as defined in claim 20 in which the ejecting means comprises a vertically reciprocable member formed with an oblique face adapted to impel the work obliquely downward by impact therewith.

22. Apparatus for assembling articles, said apparatus comprising a guideway for supporting a column of articles so that the lowermost article is in an assembling position, means for supporting another article in position to be assembled with said first-mentioned article, means for advancing the first-mentioned article from the bottom of said guideway into engagement with the second-mentioned article to effect the assembly, and an ejector adapted to engage the finished assembly to eject the latter from the apparatus in a direction transverse to the relative movement of the articles in the assembling operation.

23. In combination with means for successively manipulating small articles of determinate size and shape, such as valve caps, a feed hopper comprising a rotary, bowl-like structure formed to provide a central space adapted to receive the articles in bulk and with guide passages leading outward from said space and then longitudinally of said structure, said passages being of such form as to permit the passage of said articles therethrough only when the latter are radially disposed with relation to the axis of the rotary structure, a stationary floor member adjacent the delivery ends of said passages and formed with a floor surface adapted slidably to support said articles in said passages as said structure is rotated, said floor member being formed with an outlet passage leading from its floor face, and means for receiving said articles from said outlet passage and effecting their movement to said manipulating means.

24. In combination with means for successively manipulating small articles of determinate size and shape, such as valve-caps, a feed hopper comprising a rotary, bowl-like structure formed to provide a central space adapted to receive the articles in bulk and with guide passages leading from said space, said passages being of such form as to permit the passage of said articles therethrough only when the latter are determinately disposed, and said passages having downwardly opening delivery terminals lying substantially in a plane perpendicular to the axis of said structure, a stationary member telescoped with the end portion of said structure adjacent said terminals and formed with a ledge providing a floor surface adapted slidably to support said articles in said passages as said structure is rotated, said stationary member being formed with an outlet passage leading from its floor face and said floor face and a wall of said outlet passage defining a pick off point adapted to separate the lowermost article in each passage from those above it, and means on said structure overlying said stationary member in the zone of said outlet passage, channeled in continuation of said guide passages, and adapted to continue the engagement with said lowermost members as they are so separated and impel them through said outlet passage.

25. In combination with means for successively manipulating small articles of determinate size and shape, such as valve caps, a feed hopper comprising a rotary, bowl-like structure journaled on an inclined axis and formed to provide a central space adapted to receive the articles in bulk and with guide passages, said passages being of such form as to permit the passage of said articles therethrough only when the latter are determinately disposed, and said passages having downwardly opening delivery terminals lying substantially in a plane perpendicular to the axis of said structure, a stationary member telescoped with the end portion of said structure adjacent said terminals and formed with a ledge providing a floor surface adapted slidably to support said articles in said passages as said structure is rotated, said stationary member being formed with an outlet passage leading from its floor face and said floor face and a wall of said outlet passage defining a pick off point adapted to separate the lowermost article in each passage from those above it, and means on said structure overlying said stationary member in the zone of said outlet passage, channeled in continuation of said guide passages, and adapted to continue the engagement with said lowermost members as they are so separated and impel them through said outlet passage.

26. In combination with means for successively manipulating small articles such as valve caps, an article-feeding hopper comprising a rotary, bowl-like member adapted to receive the articles in bulk, the axis of said rotary member being inclined substantially from the vertical, said rotary member having a peripheral series of passages radiating from a central space therein, said passages extending downwardly at the outer periphery of said rotary member and terminating in a circular series of outlets, and a stationary member providing a floor for the middle portion of said rotary member, a side wall for the downwardly extending portions of said passages, and formed with a ledge constituting a floor adjacent said series of outlets, said stationary member being formed with a channel leading from said ledge and adapted to conduct articles therefrom.

27. In combination with means for successively manipulating valve caps, a feeding hopper comprising a rotary, bowl-like member adapted to receive the valve caps in bulk and having a peripheral series of radiating passages formed therein, said passages leading to a peripheral series of downwardly-extending passages formed in the marginal portion of said member, both series of passages being such as to receive valve caps only when the latter are radially disposed with relation to the axis of said rotating member, means for preventing escape of said valve-caps from said passages in a radial direction at the outer periphery of said rotary member, and a stationary member providing a floor adjacent the lower ends of said downwardly-extending passages and formed with an outlet passage through said floor.

28. In combination with means for placing sleeves on valve-cap stems, a gravity chute adapted to hold a column of valve-caps in determinate relation, said chute being adapted to release successive caps from the bottom of said column, means for dislodging successive caps from the bottom of said column and associating them with respective sleeves, and a feed hopper adapted to deliver caps in orderly relation to said chute, said chute having at a substantial distance above its lower end an inclined portion formed with an overflow outlet through its floor, said inclined portion being adapted to cause caps passing by gravity therethrough to be carried by their momentum over said outlet except when the chute is full of caps to the height of said outlet.

In witness whereof we have hereunto set our hands this 12th day of February, 1924.

GILBERT L. MATTHIAS.
WALDEMAR D. KMENTT.